J. E. WYCKOFF.
APPARATUS FOR GATHERING VEGETABLE MATTER FROM IRRIGATION CANALS.
APPLICATION FILED FEB. 8, 1917.
1,269,515.
Patented June 11, 1918.
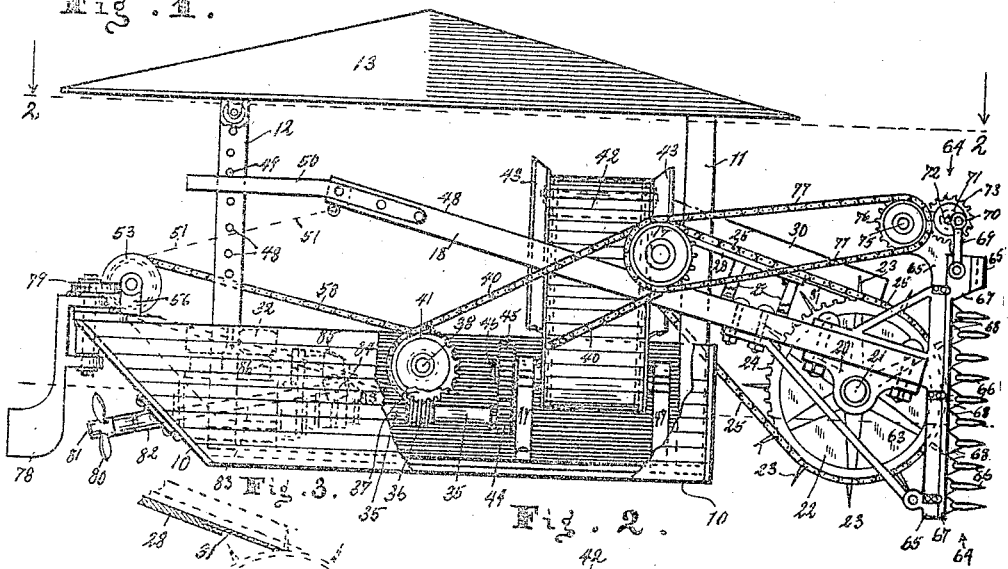

UNITED STATES PATENT OFFICE.

JOSEPH E. WYCKOFF, OF LOS ANGELES, CALIFORNIA, ASSIGNOR TO ELFA H. JONES, TRUSTEE, OF LOS ANGELES, CALIFORNIA.

APPARATUS FOR GATHERING VEGETABLE MATTER FROM IRRIGATION-CANALS.

1,269,515.  Specification of Letters Patent.  Patented June 11, 1918.

Application filed February 8, 1917. Serial No. 147,513.

*To all whom it may concern:*

Be it known that I, JOSEPH E. WYCKOFF, a citizen of the United States of America, residing at Los Angeles, county of Los Angeles, State of California, have invented a certain new and useful Apparatus for Gathering Vegetable Matter from Irrigation-Canals; and I do hereby declare the following to be a full, clear, and exact description of the invention, such as will enable others skilled in the art to which it appertains to make and use the same.

This invention relates to apparatus for gathering vegetable matter in water; and it may be said to consist in the provision of the novel and advantageous features and in the novel and improved construction, arrangement, and combination of parts and devices as will be apparent from the description and claim which follow hereinafter.

Although the apparatus is useful in other relations it is more particularly adapted for use in clearing irrigation canals and ditches of vegetable matter. In some localities, as in California, the irrigation canals and ditches are choked by rank and matted vegetation which in dying sinks and decays and gradually fills the irrigation canals and ditches. The hand methods ordinarily resorted to because of the lack of a practical apparatus for doing the work of clearing the vegetation from the canals and ditches are slow, tedious, expensive, and generally very unsatisfactory.

The main object of this invention is to provide a novel and improved apparatus which is arranged on a float and is well adapted from a practical and commercial viewpoint to work efficiently in the gathering of vegetable matter in water, the apparatus in this instance being more particularly designed for use to clear irrigation canals and ditches of vegetable matter.

Other objects and the advantages of the invention will be apparent to those skilled in the art from a careful consideration of the following description of the preferred form of the apparatus, taken in connection with the accompanying drawings in which—

Figure 1 is a broken side elevational view showing the apparatus; Fig. 2 is a broken view of the apparatus taken on the line 2—2 of Fig. 1; and Fig. 3 is a broken sectional view taken on the line 3—3 of Fig. 2.

As shown by the drawings in this instance the float or barge 10 has at its forward end the standards 11 and it has at its rear end the standards 12. A canopy 13 may be suitably fastened to the upper part of the standards 11 and 12.

To the standards 11 are suitably secured the bearings 14 for the shaft 15 which is provided at one end with the sprocket wheels 16 and 17.

On the shaft 15 are pivotally mounted the spaced arms 18 which have on their upper sides the bearings 19 which are mounted at the ends of the shaft 15. To the end parts of the arms 18 which extend beyond the forward end of the float 10 are suitably secured the bearings 20 for the shaft 21 of the drum 22. The latter is provided with spaced rows of substantially radial teeth or projections 23 which are stationarily mounted thereon, and it is provided on its end and middle portions with the sprocket teeth 24 whereby it is operatively connected by the sprocket chains 25 to the sprocket wheels 26 on the shaft 15. To the sprocket chains 25 are suitably connected the end parts of the spaced strips 27 which latter in passing over the drum 22 are disposed in the spaces between adjacent rows of the teeth 23. The sprocket chains 25 and strips 27 in passing from the upper part of the drum 22 to the upper part of the sprocket wheels 26 are supported by and travel on the platform 28 which is mounted on the supports 29 which are suitably secured to the arms 18. The platform 28 is provided with side boards 30, and it has its end portion adjacent to the upper part of the drum 22 provided with fingers 31 which as shown are disposed between adjacent teeth of a row of the teeth 23 so that the fingers 31 clear the teeth 23 of material picked up and held by the teeth 23 when the drum 22 is rotated in use.

In the float or barge 10 is suitably arranged the motor 32 whose shaft has thereon the fly wheel or pulley 33 and is operatively connectible by a suitable clutch 34 to the shaft 35 which latter has thereon the worm 36 in mesh with the worm wheel 37 which is mounted on the shaft 38 which is mounted in suitable bearings 39. The shaft 38 is operatively connected to the shaft 15 by the sprocket chain 40 which connects the sprocket wheel 16 to the sprocket wheel 41 on the shaft 38.

At the end of the platform 28 adjacent to the shaft 15 is arranged a suitable conveyer 42 which is provided with side boards 43 to confine the material, and which extends outwardly beyond one side of the float 10 so that the material when it has been moved over the platform 28 is carried by the conveyer 42 and can be deposited on a barge or on the bank of the canal or ditch. The conveyer 42 is operatively connected to the shaft 35 by the spur wheel 44 which is mounted on the shaft 35 and in mesh with the spur wheel 45 which is mounted on the shaft 46 which latter is mounted on suitable standards 47 and is operatively connected to the conveyer 42.

The drum 22 which is arranged at the outer ends of the pivoted arms 18 can be raised or lowered at will by moving down or up the inner end portions of said arms 18 which can be locked in adjusted position by placing in the openings 48 in the standards 12 the removable stops 49 against which bear the extensions 50 on the arms 18. The inner end portions of the arms 18 can be pulled down by the cable 51 which has one end portion suitably connected to the crosspiece 52 on the arms 18 and is coiled around the winding drum 53 and has its other end portion passed through the sheave 54 suitably attached to the lower part of one of the standards 12. The winding drum 53 has its shaft 55 mounted or the standards 56 at the rear of the float 10, and said shaft 55 has thereon a sprocket wheel 57 which is connected by the sprocket chain 58 to the sprocket wheel 59 on the shaft 60 which latter is mounted in a suitable bearing 61 and is operatively connectible to the shaft 38 by means of a suitable clutch 62.

The drum 22 may have a shield plate 63 on one or both of its ends to avoid entanglement with the material being worked on, and said drum 22 may be provided on one of its arms 18 with a cutter 64 arranged adjacent to the drum 22 to cut the material being worked on so that the material is more easily picked up by the teeth 23 of the drum 22. As shown in this instance the cutter 64 consists of the bar 65 provided with fixed knives or fingers 66, and a movable bar 67 provided with triangular knives 68 which work between slots in the fingers 66 when the bar 67 is reciprocated by suitable means. The latter may consist of the link 69 which is pivotally connected to the bar 67 and to the crank arm 70 on the disk 71 which is mounted on the shaft 72 which latter bears in the upper part of the bar 65 and has a spur wheel 73 in mesh with a spur wheel 74 on the shaft 75 which bears in the upper part of the bar 65 and has a sprocket wheel 76 operatively connected by the sprocket chain 77 to the sprocket wheel 17 on the shaft 15.

A rudder 78 to which is connected the tiller 79 may be suitably mounted on the rear of the float 10, and the latter may be self-propelled by means of the propeller 80 on the shaft 81 which passes through a suitable stuffing box 82 on the rear of the float 10 and extends into a suitable bearing 83 and is provided with a bevel pinion 84 in mesh with a bevel pinion 85 on the shaft 86 which latter is mounted in a suitable bearing 87 and has thereon a loose pulley 88 which is connected by belt 89 to the fly wheel 33 so that the shaft 86 can be operatively connected to the motor 32 by operating a suitable clutch 90 which is mounted on the shaft 86.

From the foregoing the construction, operation and advantages of the apparatus will be understood by those skilled in the art. When the apparatus is operated in an irrigation canal or ditch, it will be seen that the drum 22 can be lowered to have the teeth 23 pick up and gather vegetable material—dead or live—and carry the vegetable material to the upper part of the drum 22 where the material falls onto the strips 27 which move it over the platform 28 to the conveyer 42. While the material is being carried by the strips 27 and the teeth 23 are passing between the fingers 31 the latter prevent the material from being carried downwardly by the teeth 23 when the latter turn in their downward movement between the strips 27 and thus the teeth 23 are cleared of the material.

The construction which has been particularly illustrated and described admits of minor changes and modifications, wherefore the right is reserved to all such changes and modifications as do not depart from the spirit and scope of the invention which is defined in the appended claim.

I claim:

Apparatus of the class specified, comprising the combination of a float, a shaft mounted thereon, a second shaft, spaced arms pivotally mounted on the first mentioned shaft and having the second shaft mounted on a portion thereof extending beyond the float, a drum mounted on the second shaft, spaced rows of teeth stationarily mounted on the drum, sprocket chains operatively connected to the first mentioned shaft and to said drum, spaced strips connected to the sprocket chains and adapted when passing around the drum to be disposed in the spaces between the rows of teeth on said drum, and a platform having fingers between which the teeth pass substantially as and for the purpose set forth.

In testimony whereof, I have signed my name to this specification at Los Angeles, county of Los Angeles, State of California, this 27th day of January A. D. 1917.

JOSEPH E. WYCKOFF.